United States Patent
Papadopoulos et al.

(10) Patent No.: US 10,833,842 B2
(45) Date of Patent: Nov. 10, 2020

(54) WIRELESS AUDIO SYSTEM WITH MULTIPOINT CONNECTIVITY USING DECT OR BLUETOOTH

(71) Applicant: HEADPHONE EVENTS, INC., Woburn, MA (US)

(72) Inventors: Costas Papadopoulos, Acton, MA (US); Joseph Genovese, Lincoln, MA (US)

(73) Assignee: Headphone Events, Inc., Woburn, MA (US)

( * ) Notice: Subject to any disclaimer, the term of this patent is extended or adjusted under 35 U.S.C. 154(b) by 0 days.

(21) Appl. No.: 16/008,534

(22) Filed: Jun. 14, 2018

(65) Prior Publication Data

US 2018/0367295 A1     Dec. 20, 2018

Related U.S. Application Data (60) Provisional application No. 62/521,743, filed on Jun. 19, 2017.

(51) Int. Cl.
| | |
|---|---|
| *H04L 9/06* | (2006.01) |
| *H04R 3/12* | (2006.01) |
| *H04L 9/14* | (2006.01) |
| *H04R 1/10* | (2006.01) |

(52) U.S. Cl.
CPC ............. *H04L 9/06* (2013.01); *H04L 9/14* (2013.01); *H04R 1/1091* (2013.01); *H04R 3/12* (2013.01); *H04L 2209/80* (2013.01); *H04R 2420/03* (2013.01); *H04R 2420/07* (2013.01)

(58) Field of Classification Search
CPC ........ H04R 3/12; H04R 5/04; H04R 2420/00; H04R 2420/03; H04R 2420/07; H04L 9/06; H04L 9/14; H04L 2209/80
USPC ...... 381/315, 77, 79–82, 85; 455/3.01, 3.06, 455/41.2
See application file for complete search history.

(56) References Cited

U.S. PATENT DOCUMENTS

| | | | |
|---|---|---|---|
| 7,912,020 B2 * | 3/2011 | Khasawneh | H04M 3/56 370/338 |
| 8,169,938 B2 * | 5/2012 | Duchscher | H04L 1/0057 370/310 |
| 8,488,822 B2 | 7/2013 | Klemmensen | |
| 8,571,612 B2 * | 10/2013 | Gold | H04W 88/02 455/575.2 |
| 9,866,975 B2 * | 1/2018 | Secall | H04R 25/554 |
| 2008/0194209 A1 * | 8/2008 | Haupt | H04H 20/63 455/73 |
| 2019/0289653 A1 * | 9/2019 | Sarkar | H04W 12/08 |

* cited by examiner

*Primary Examiner* — Xu Mei
(74) *Attorney, Agent, or Firm* — Gesmer Updegrove LLP (57) ABSTRACT

A wireless audio system is provided that includes plurality of transmitters that digitizes and encrypts audio signals in compliance with a defined protocol standard. A plurality of listening apparatuses receive the audio signals and process the audio signals for listening within the listening apparatuses, wherein each transmitter is designated an identifier to facilitate selection and connection to one or more listening apparatuses with the desired transmitter simultaneously.

12 Claims, 12 Drawing Sheets

WIRELESS AUDIO SYSTEM WITH MULTIPOINT CONNECTIVITY USING DECT OR BLUETOOTH

PRIORITY INFORMATION

This application claims priority from provisional application Ser. No. 62/521,743 filed Jun. 19, 2017, which is incorporated herein by reference in its entirety.

BACKGROUND OF THE INVENTION

The invention relates to the field of wireless audio transmission from several transmitters selectively to one or more receivers via a DECT or Bluetooth radio link.

Wireless systems for group listening are commonly based on narrowband FM analog transmission at an unlicensed frequency band such as Industrial Scientific Medical (ISM) at 902 to 928 MHz in the US. Such systems, for instance Silent Disco by Party Headphones are not secure in that a third party radio receiver within range of the transmitter may be tuned to intercept the audio signal. Furthermore the transmitter has no knowledge or awareness of any of the receivers. With analog FM there is no limit to the number of receivers. When the system is operating in unlicensed spectrum, it may be interfered by industrial equipment (drying ovens), scientific equipment (plasma lamps) or medical equipment (diathermy machines), as well as other analog or digital ISM radio links.

Prior art U.S. Pat. No. 8,488,822 discloses a DECT-based assistive listening system where the transmitter must operate with at least two receiving devices in order to establish and maintain a radio link. There is no finite limit to the number of receivers, however, one and only one transmitter may be engaged.

The Eversound GLS 2.0 is a DECT-based group listening system with one transmitter and ten headphones, uniquely connectable to the one transmitter after a registration process at the factory or in the field. This registration mandates a physical connection with external hardware. Any of the headphones may subsequently be registered with another transmitter, however the previous connectivity with the first transmitter is then erased and lost, as mandated by DECT.

SUMMARY OF THE INVENTION

According to one aspect of the invention, there is provided a wireless audio system. The wireless audio system includes plurality of transmitters that digitizes and encrypts audio signals in compliance with a defined protocol standard. A plurality of listening apparatuses receive the audio signals and process the audio signals for listening within the listening apparatuses, wherein each transmitter is designated an identifier to facilitate selection and connection to one or more listening apparatuses with the desired transmitter simultaneously.

According to another aspect of the invention, there is provided a method of operating a wireless audio system. The method includes digitizing and encrypting audio signals in compliance with a defined protocol standard using a plurality of transmitters. Also, the method includes receiving the audio signals and processing the audio signals for listening within the listening apparatuses, wherein each transmitter is designated an identifier to facilitate selection and connection to one or more listening apparatuses with the desired transmitter simultaneously.

According to another aspect of the invention, there is provided a wireless audio system. The wireless audio system includes a communication module that receives and sends information from a define number of listening apparatuses to be registered with a transmitter. A control unit manages the registration of the listening apparatuses with the transmitter by assigning the transmitter an identifier so as to allow the transmitter to be simultaneously connected to the listening apparatuses.

According to another aspect of the invention, there is provided a method of performing the operations of a wireless audio system. The method includes receiving and sending information from a defined number of listening apparatuses to be registered with the transmitter using a communication module. Also, the method includes managing the registration of the listening apparatuses with the transmitter by assigning the transmitter an identifier so as to allow the transmitter to be simultaneously connected to the listening apparatuses.

According to another aspect of the invention, there is provided a wireless audio system. The wireless audio system includes a communication module that receives and sends information from a defined number of transmitters to be registered with a listening apparatus, each transmitter is assigned an identifier. A control unit manages the registration of the transmitters with the listening apparatus by assigning the listening apparatus the identifiers associated with the transmitters so as to allow the listening apparatus to be connected to the transmitters at any given time.

According to another aspect of the invention, there is provided a method of performing the operations of a wireless audio system. The method includes receiving and sending information from a defined number of transmitters to be registered with a listening apparatus using a communication module, each transmitter is assigned an identifier. Also, the method includes managing the registration of the transmitters with the listening apparatus by assigning the listening apparatus the identifiers associated with the transmitters using a control unit so as to allow the listening apparatus to be connected to the transmitters at any given time.

DETAILED DESCRIPTION OF THE INVENTION

The invention describes a wireless audio system based on DECT or Bluetooth radio link including at least one listening apparatus configured to respond selectively to any one of several transmitters. The listening apparatus may comprise an electronic unit separate from and connected to ear buds or headphones, or the listening apparatus may comprise self-contained earphones that incorporate batteries and electronics. Each transmitter is visually designated by color or number or name to facilitate selection and connection of the listening apparatus with the desired transmitter. The selection, once made, is exclusive of all other transmitters. The transmitters are constructed to connect with various audio sources such as microphones, TV sets, music players, smartphones or computers. Each transmitter digitizes and encrypts the audio signals in compliance with the DECT or Bluetooth standard. After a unique digital registration process, the transmitter may be linked securely to one or several listening units simultaneously.

DECT or Digital Enhanced Cordless Telecommunications is a wireless standard for voice and data at an exclusive frequency allocation. In North America, DECT 6.0 operates at five RF channels in the vicinity of 1.9 GHz. A DECT system comprises a Fixed Point FP (base station or transmitter and one of more Portable Points PPs (such as handsets, headsets, or headphones). DECT is secure by design via 128-bit encryption and each FP is securely registered to one or more PPs. This registration is mandatory in order to establish a DECT link between FP and PP or PPs via a unique 128-bit authentication key stored at each DECT device. Said otherwise, registration is asymmetrical in that the transmitter FP will store the encryption keys for all registered headphone PPs, while each headphone will store the one transmitter key.

DECT implementation for a wireless audio system may utilize a pre-certified module such as Dialog Semiconductor SC14WAMDECT at each FP and PP. The DECT firmware engine inside the module manages the receiver PP to transmitter FP link, encryption, registration, RF channel, time-slot selection, the module also providing several I/O lines. One of the preprogrammed firmware utilities of SC14WAMDECT is called "tour guide mode" where one FP (a tour guide with a microphone) may speak to several listeners (up to 128, wearing headphones). I/O lines from the Dialog module may connect to power, LEDs and switches, audio inputs (for FP) or audio outputs (for PP) as well as to digital circuitry via API digital protocol. In the first embodiment of the invention a number of the I/O lines are connected to a microcontroller unit (MCU). The MCU runs the firmware of the present invention, which in turn manages all human-machine interface matters, including initiation of the registration process. The inventive firmware is beyond the scope of the DECT standard.

Registration is required for successful, secure and unique FP to PP communication via DECT. The registration for DECT equipment is initially performed at the factory. Systems with SC14WAMDECT modules may later be re-registered in the field, by utilizing temporary external hardware connections. In order to achieve multipoint operation of any headphone with the four inventive transmitters as in the first embodiment, additional circuitry and MCU firmware are embedded in the headphone of the invention. This construction with the inventive firmware of the first embodiment allows four separate encryption keys (from four transmitters) to be stored in non-volatile memory and conveniently invoked, one registration key at a time, the key that corresponds with the desired transmitter. It will be shown that the first embodiment of the invention discloses multipoint operation with four transmitters, however a significantly higher number of transmitters may operate within the scope of the invention as will be shown later with reference to FIG. 7.

A suitable component for the inventive wireless audio system when based on Bluetooth is the Microchip BM64SPKA1MC1 module. Firmware provided by the manufacturer Microchip enables the BM64 module to communicate as one FP transmitter to many PP headphones. The required firmware of the present invention for multi-transmitter registration, storage of encryption keys and audio operation is similarly made possible by external MCU and non-volatile memory as described above with reference to SC14WAMDECT.

Bluetooth is an alternative RF link technology for use with wireless headphones. Bluetooth operates at frequencies between 2402 and 2480 MHz. This is in the globally unlicensed (but not unregulated) industrial, scientific and medical ISM 2.4 GHz short-range radio frequency band. Bluetooth uses a radio technology called frequency-hopping spread spectrum. Bluetooth divides transmitted data into packets, then transmits each packet on one of 79 designated Bluetooth channels. Each channel has a bandwidth of 1 MHz. It usually performs 800 hops per second, with Adaptive Frequency-Hopping (AFH) enabled. In the instance of other Bluetooth systems operating in close proximity, AFH self-adjusts the hopping pattern to avoid interference.

Originally, Gaussian frequency-shift keying (GFSK) modulation was the only modulation scheme available. Since the introduction of Bluetooth 2.0+EDR, $\pi/4$-DQPSK (differential quadrature phase shift keying) and 8DPSK modulation may also be used between compatible devices. Devices functioning with GFSK are said to be operating in basic rate (BR) mode where an instantaneous bit rate of 1 Mbit/s is possible. The term Enhanced Data Rate (EDR) is used to describe $\pi/4$-DPSK and 8DPSK schemes, each giving 2 and 3 Mbit/s respectively. The combination of these (BR and EDR) modes in Bluetooth radio technology is classified as a "BR/EDR radio". Bluetooth is a packet-based protocol with a master/slave architecture. One master may communicate with up to seven slaves in a piconet. All devices share the master's clock. Packet exchange is based on the basic clock, defined by the master, which ticks at 312.5 µs intervals. Two clock ticks make up a slot of 625 µs, and two slots make up a slot pair of 1250 µs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

FIGS. 1A-1D is a schematic diagram illustrating the connectivity of a headphone 6 with up to four transmitters 8, 10, 12, 14. The transmitters 8, 10, 12, 14 being readily selectable, one at a time, by the user. In particular, FIGS. 1A-1D indicates the ability for the user to move about different rooms 1-4 or auditorium and listen, by way of a transmitter selection, to audio content via the headphone 6 originating in each room 1-4. FIGS. 1A-1D depict the same headphone 6 selectively connected to four transmitters, one at a time: transmitter 8 (blue LED), 10 (green LED), 12 (red LED) and 14 (white LED). It is feasible, however, a transmitter can retain in non-volatile memory within a communication module encryption keys for up to 127 additional headphones which will be further discussed in FIG. 5.

Figure 2A:
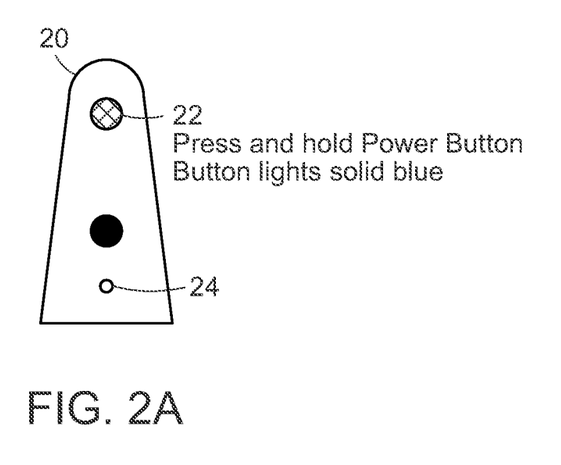
FIGS. 2A-2D are schematic diagrams illustrating the process for assigning the LED color of a transmitter in accordance with the invention.
Figure 2B:
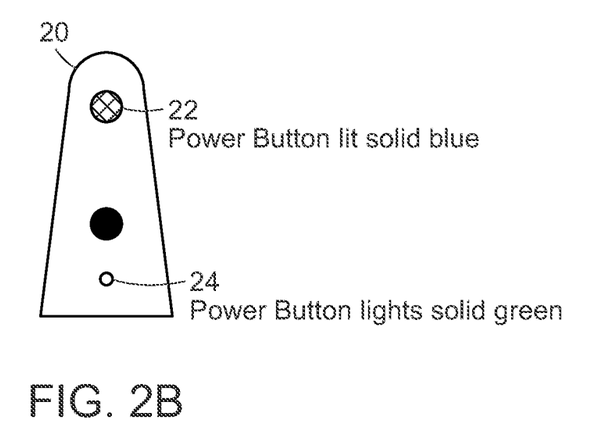
Figure 2C:
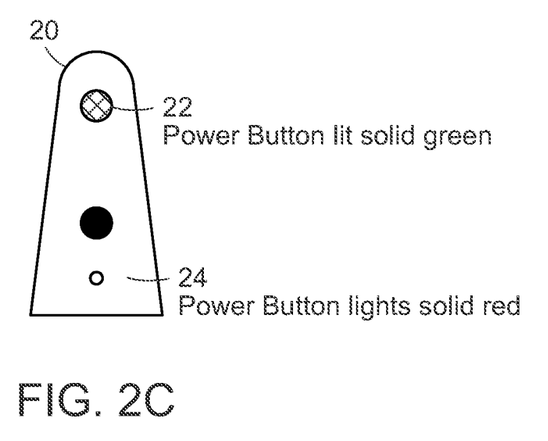
Figure 2D:
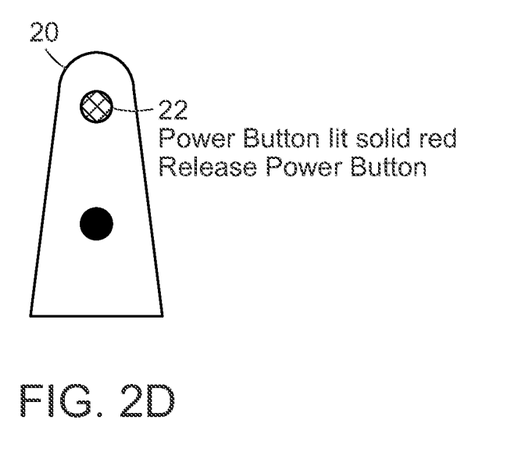

FIGS. 2A-2D are schematic diagram illustrating the process for registering a transmitter. In a multi-room system each transmitter must be assigned a unique color code. Each headphone can be registered with up to four different transmitters. The order of selection of these codes is as follows: Blue, Green, Red, White. In particular, FIGS. 2A-2D depict the process for a transmitter 30 to be configured to display red LED color so that it may be seen later and selected as red by a headphone user. FIG. 2A shows powering a transmitter 20 by pressing and holding the power button 22 which results in the button lights being blue. FIG. 2B shows turning the power button 22 from blue to green by holding the power button down and press and release the hidden registration button 24 with a paper clip. FIG. 2C shows turning the power button 22 from green to red by holding the power button 22 down and press and release the hidden registration button 24 with a paper clip. FIG. 2D shows the power button 22 being lit red and when one releases the power button it goes dark and the transmitter 20 is powered off.

The color assignment is performed once and at the transmitter 20, LED color 17 so assigned is stored in non-volatile memory. The memory will be discussed below with reference to FIG. 5, where EEPROM 82 within a microcontroller unit (MCU) 74 inventive firmware stores the LED red color just assigned. Multi-color LED cluster 84 in FIG. 5 may be positioned behind the translucent power button 22 of FIGS. 2A-2D.

Note in other embodiments of the invention each transmitter can be visually designated by number or name to facilitate selection and connection of the listening apparatus with the desired transmitter in the fashion mentioned, such that several transmitters (more than four) may be selected with the inventive firmware.

Figure 3A:
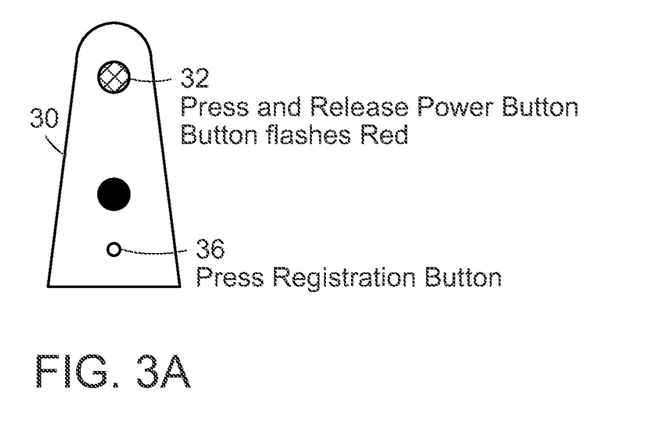
FIGS. 3A-3D are schematic diagrams illustrating the process for registering a headphone with the selected transmitter in accordance with the invention.
Figure 3B:
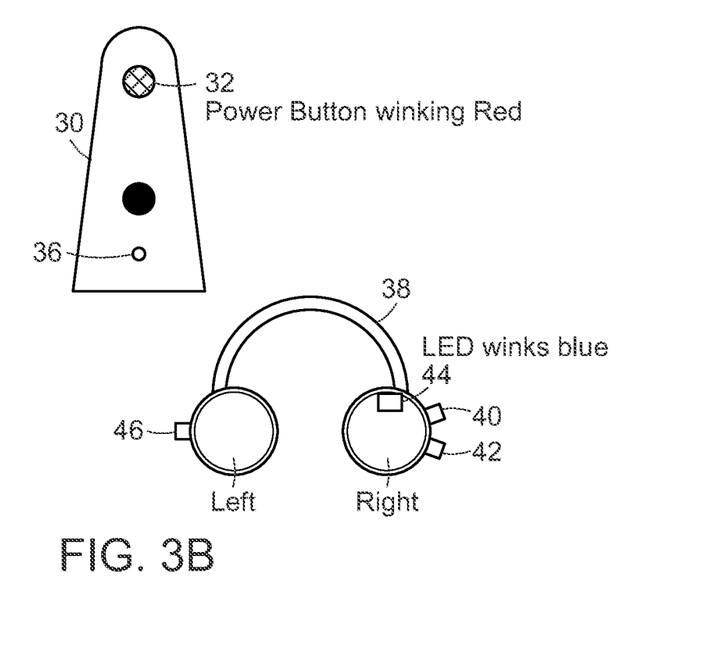
Figure 3C:
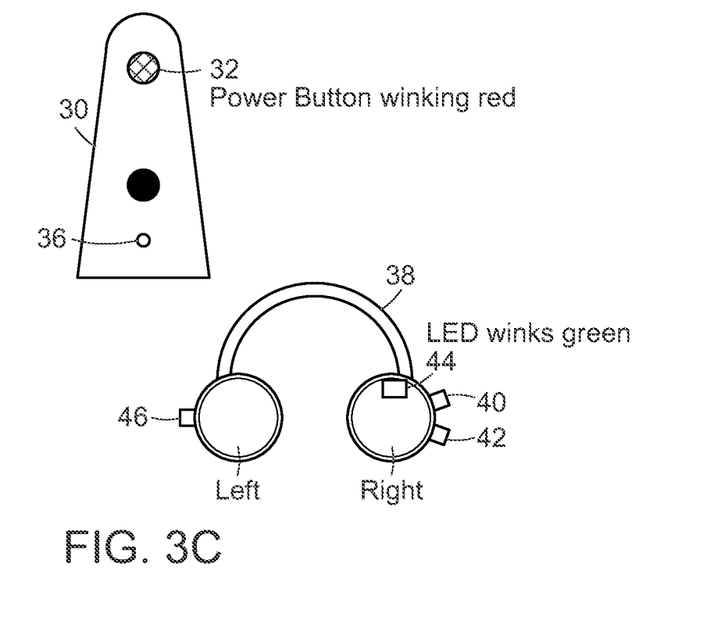
Figure 3D:
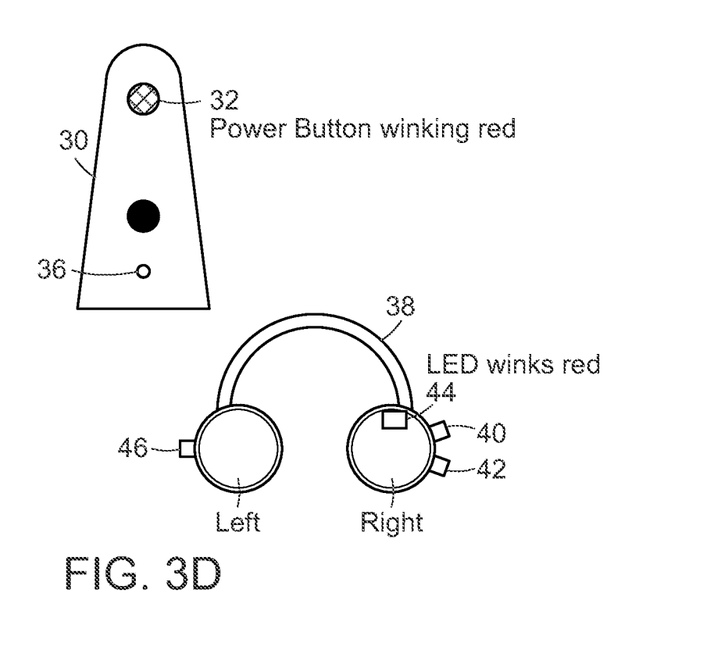

FIGS. 3A-3D are schematic diagrams illustrating registering a wireless headphone in accordance with the invention. First, the power button 32 of a transmitter 30 is pressed to initiate red registration mode as shown in FIG. 3A. At the wireless headphone 38, registration is invoked by pressing Volume up button 40 and Volume down button 42 simultaneously, as shown in FIG. 3B. In this case, the headphone 38 includes a LED cluster 44 that flashes blue once the Volume up and Volume down buttons 40, 42 are pressed. The user continues to press the Volume up and Volume down buttons 40, 42 simultaneously which results in the LED cluster 44 flashing green, as shown in FIG. 3C. Once more, the user continue to press the Volume up and Volume down buttons 40, 42 simultaneously which results in the LED cluster 44 flashing red, as shown in FIG. 3D. This matches the color of the power button 32. Then the user presses button 42. After a few seconds of handshaking between transmitter 30 and headphone 38, the «red» registration process is completed. The headphone LED cluster 44 flashes red for 2 seconds once registration is complete and then goes dark as the headphone 38 powers down. If registration fails the headphone LED cluster 44 will eventually go dark without its LED flashing. The headphone 38 can additionally be registered with up to three other inventive transmitters, as shown in FIG. 1.

Figure 4A:
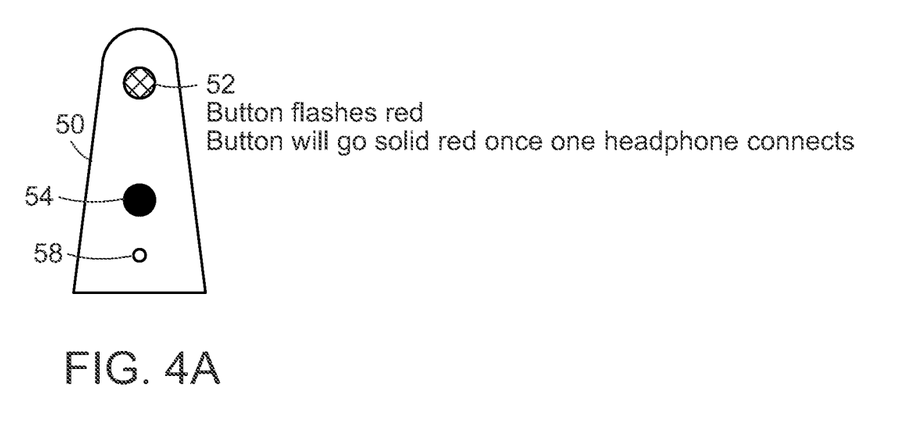
FIGS. 4A-4D are schematic diagrams illustrating the process for normal wireless listening in accordance with the invention.
Figure 4B:
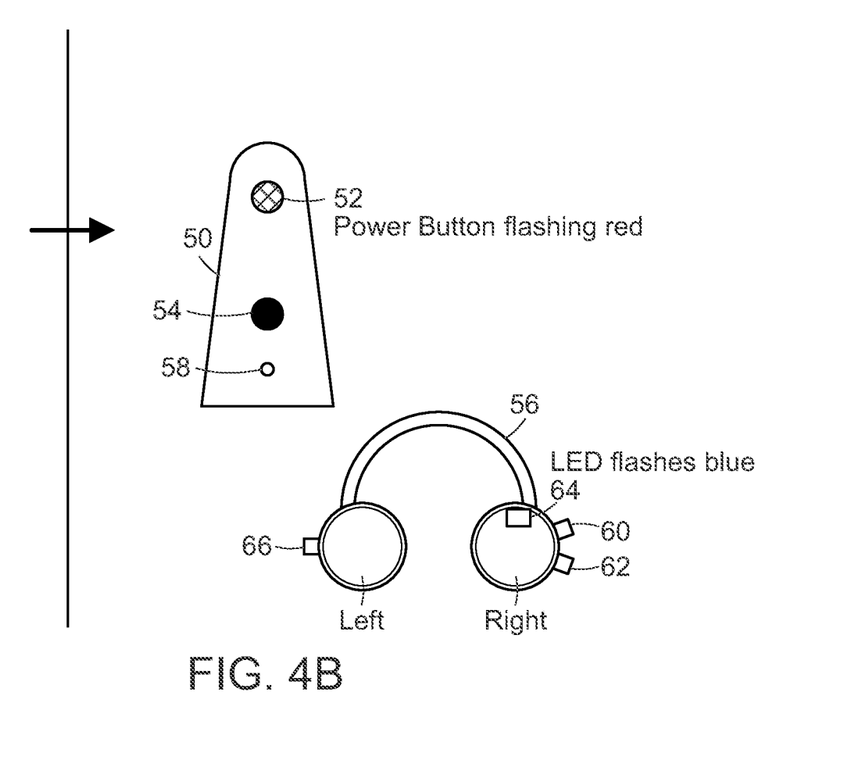
Figure 4C:
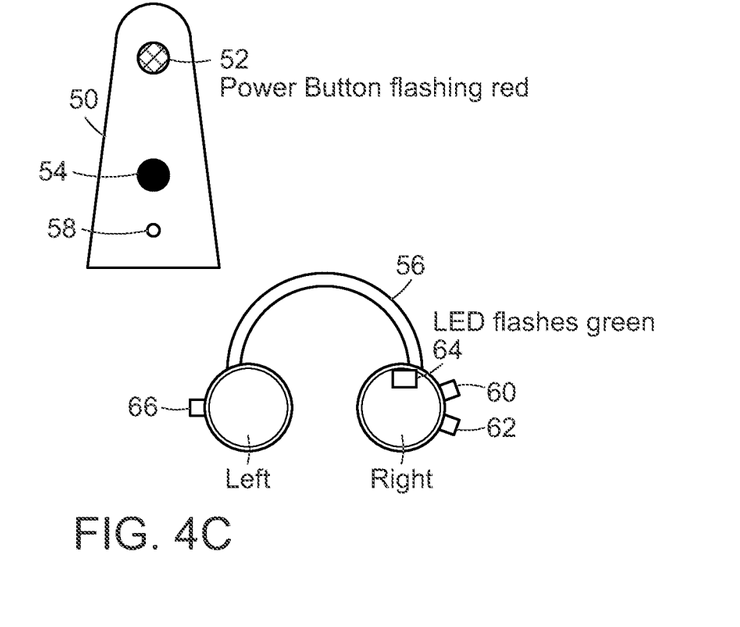
Figure 4D:
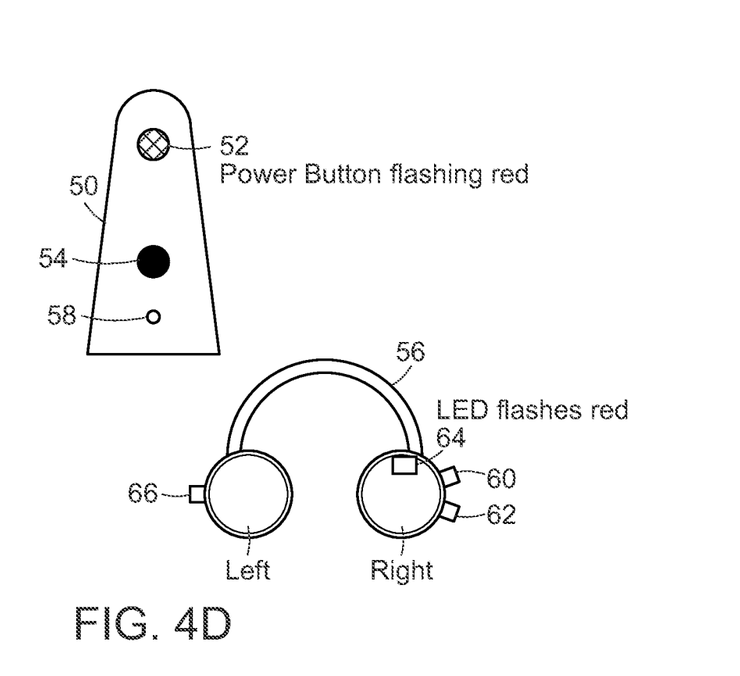

Following transmitter color assignment and headphone registration, normal wireless audio operation is enabled using the process shown in FIGS. 4A-4D. Here audio signals from a transmitter 50 are received by headphone 56. First, the power button 52 of the transmitter 50 is pressed to initiate red registration mode via button 58, as shown in FIG. 4A. At the headphone 56, registration is invoked by pressing Volume up button 60 and Volume down button 64 simultaneously, as shown in FIG. 4B. In this case, the headphone LED cluster 64 flashes blue once the Volume up and Volume down buttons 60, 62 are pressed. The user continues to press the Volume up and Volume down buttons 60, 62 simultaneously which results in the headphone LED cluster 64 flashing green, as shown in FIG. 4C. Once more, the user continue to press the Volume up and Volume down buttons 60, 62 simultaneously which results in the LED cluster 64 flashing red, as shown in FIG. 4D. This matches the color of the power button 52. Then the user presses button 66 as indicated. After a few seconds of handshaking between the transmitter 50 and headphone 56, the headphone 56 should be connected to the transmitter 50 and the Power button 52 as well as the LED cluster 64 on the headphone 56 will both turn to a solid red as indicating the connection.

The audio session begins when signals from a microphone and/or from a TV, DVD player, smartphone etc. are connected to transmitter 50 via 3.5 mm plug at audio jack 54. Headphone volume level is adjusted with Volume Up button 60 and Volume Down button 62.

Figure 1A:
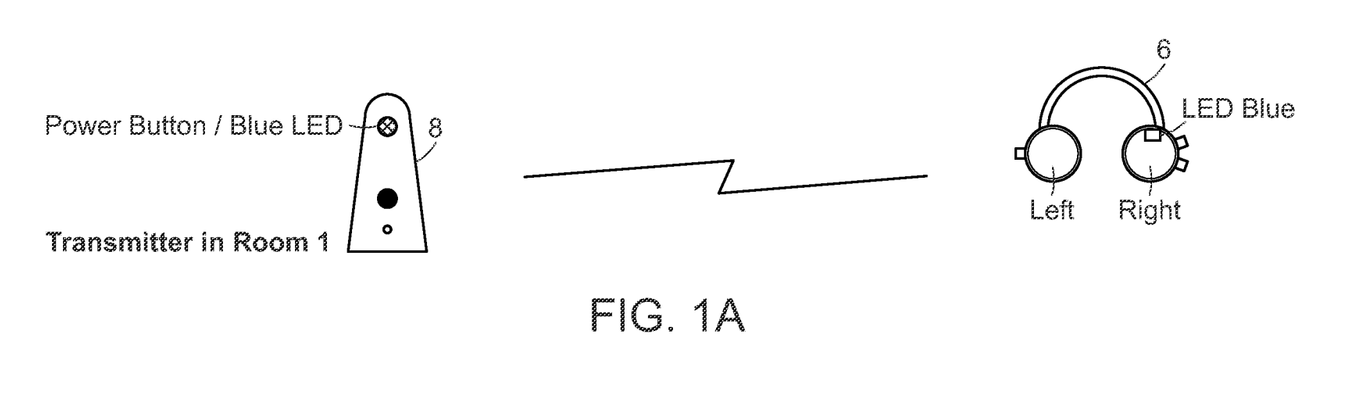
FIGS. 1A-1D are schematic diagrams illustrating an overview of the entire wireless system indicating multipoint, multi-transmitter connectivity in accordance with the invention.
Figure 1B:
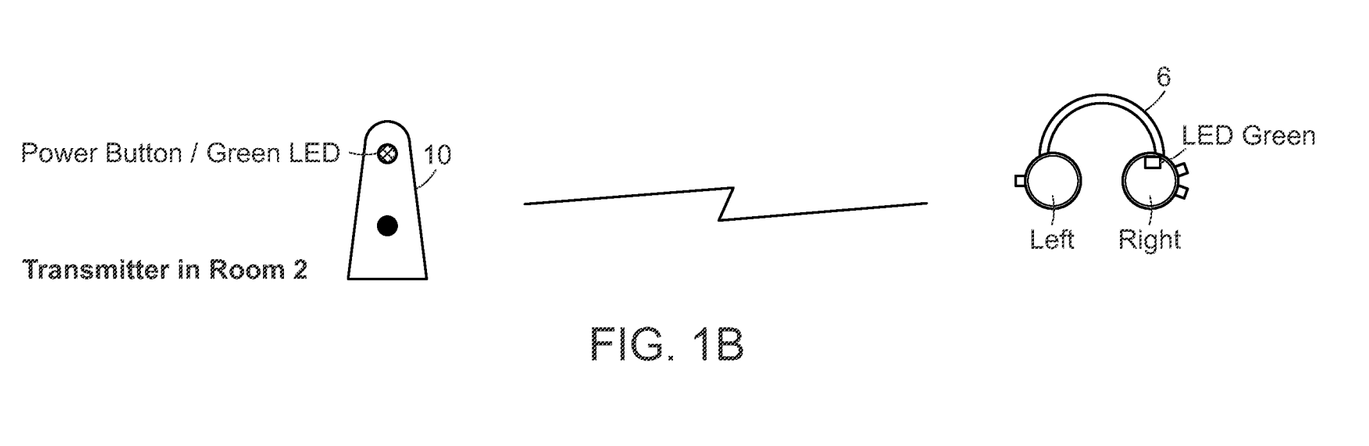
Figure 1C:
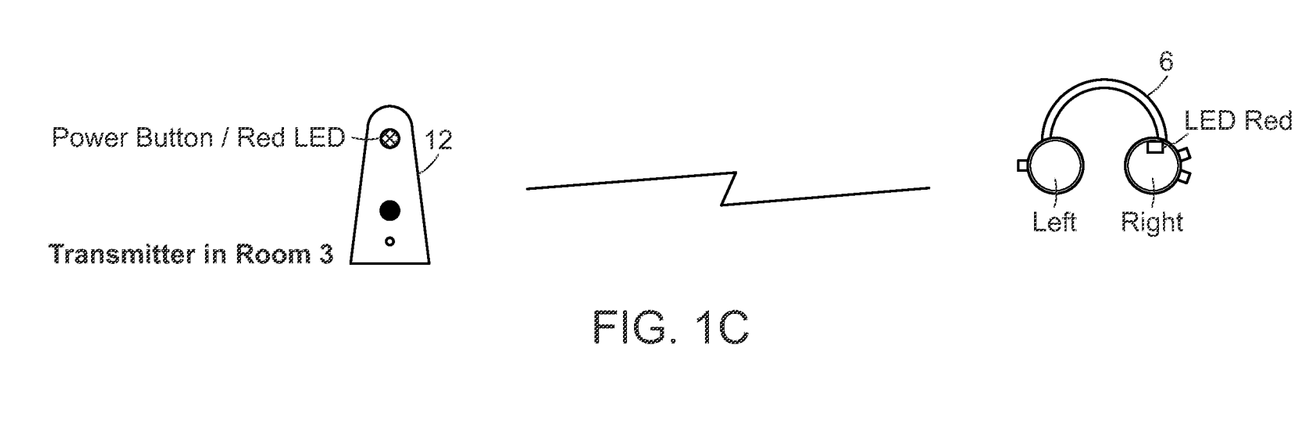
Figure 1D:
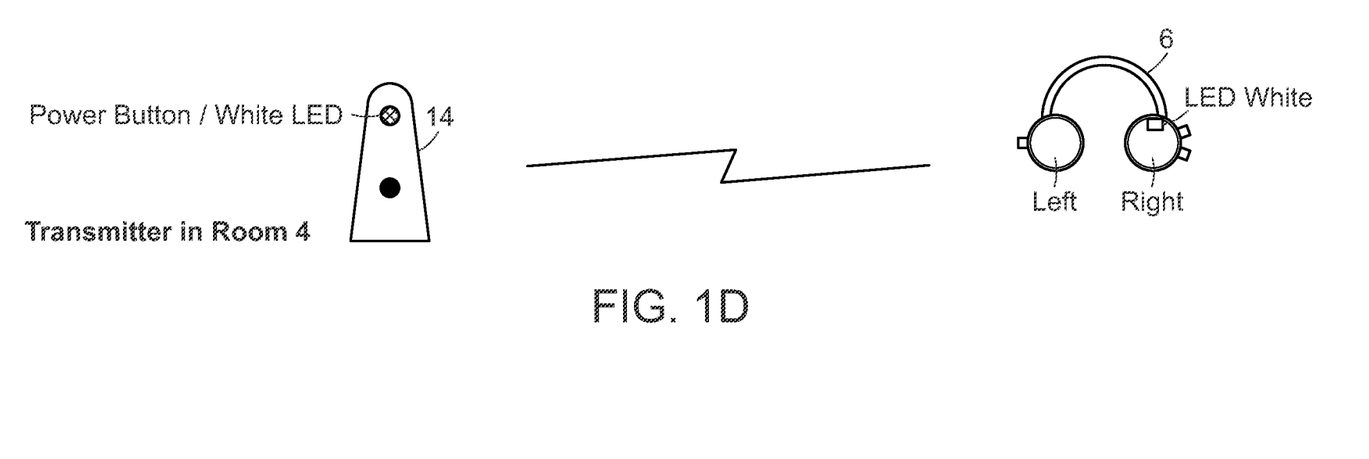
Figure 5:
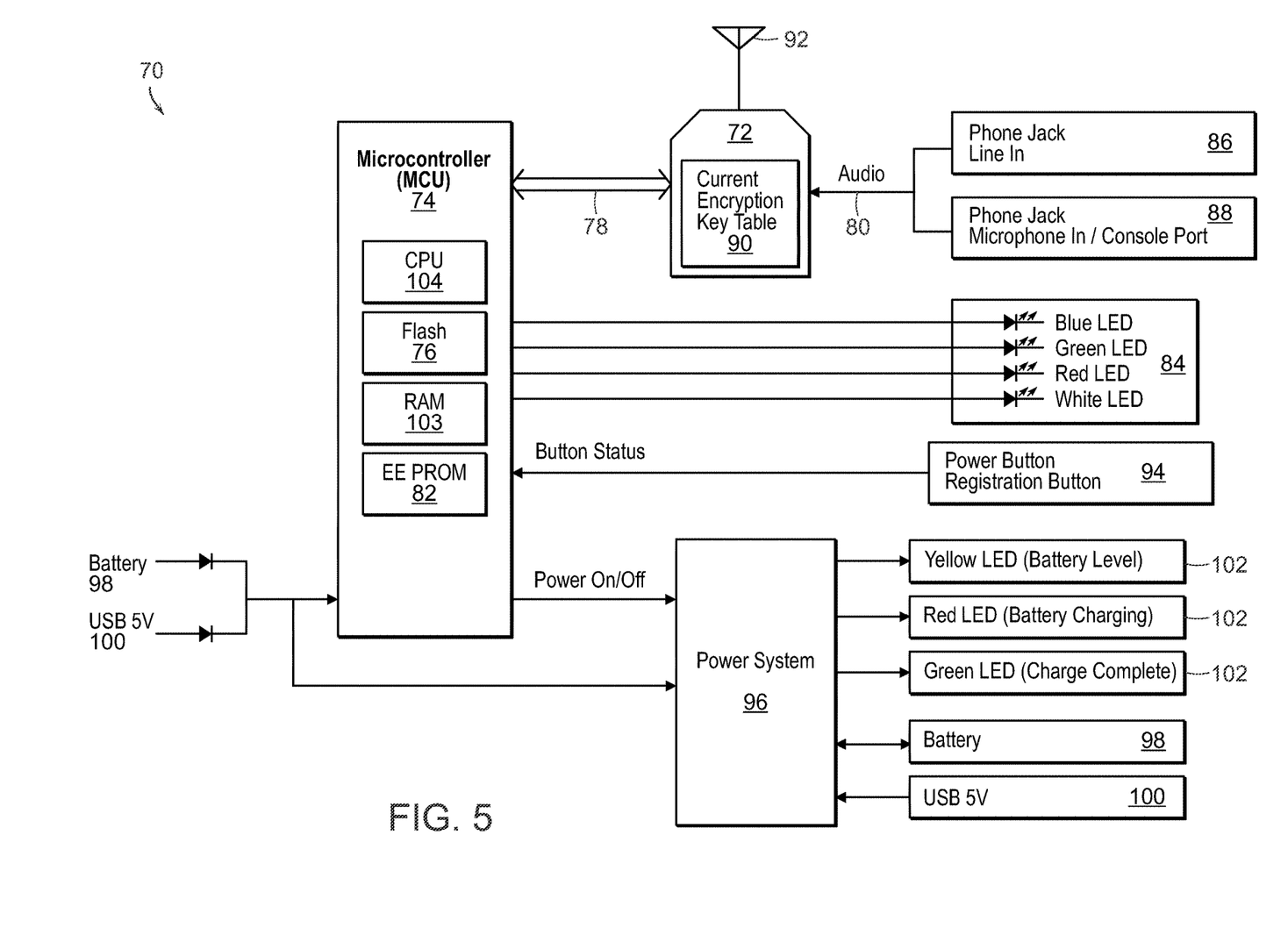
FIG. 5 is a schematic diagram illustrating the transmitter used in accordance with the invention.

FIG. 5 is schematic diagram illustrating the transmitter 70 used in accordance with the invention. The transmitter 70 includes a communication module 72 being controlled by the microcontroller unit (MCU) 74 and flash memory 76 via control bus 78. The bus 78 is typically an API link. The link is bidirectional in that the communication module 72 does also return data to MCU 74, for instance «RF link OK» or «RF link lost». Other data may be exchanged via bus 78, for instance volume level from audio path 80. The assigned color of the transmitter 70, for instance red is stored in EEPROM 82 and the inventive firmware, which is executed on a CPU 104 leveraging RAM 103, directs LED cluster 84 to display red. Voice signals from a microphone at jack 86 or line level audio signals from jack 88 are filtered and their level adjusted for presentation at audio path 80 to communication module 72. As noted previously with reference to FIG. 1, registration data (encryption keys) for up to 128 headphones are stored in non-volatile memory at current encryption key table 90. The table 90 can be populated further with more headphone keys or perhaps erased via commands from control bus 78. Table 90 is populated via wireless encrypted signals as each headphone is being registered, one at a time, the signals arriving at antenna 92 then demodulated by communication module 72 and stored at table 90.

The MCU 74 receives a signal regarding the status of the power button 94 when the power button 94 is on or the registration status that the power button 94 is flashing. A power system module 96 controls the overall power used by the transmitter 70 by managing the power sources used by the MCU 74, such as a battery 98 or USB 5V port 100, as well as powering on/off the MCU 74. The power system module 96 receives signals from the MCU 74 to indicate the status levels of the various LED clusters 102 to display their respective status, such as charging, battery low, or charge complete, as well as the status levels of the battery 98 or USB 5V port 100.

The communication module 72 receives and transmits information to a headphone via the antenna 92. Also, the communication module 72 processes what it receives and transmits using a defined communication protocol for encoding and decoding. The invention is robust to work with any communication protocol, such DECT, Bluetooth, or the like.

Figure 6:
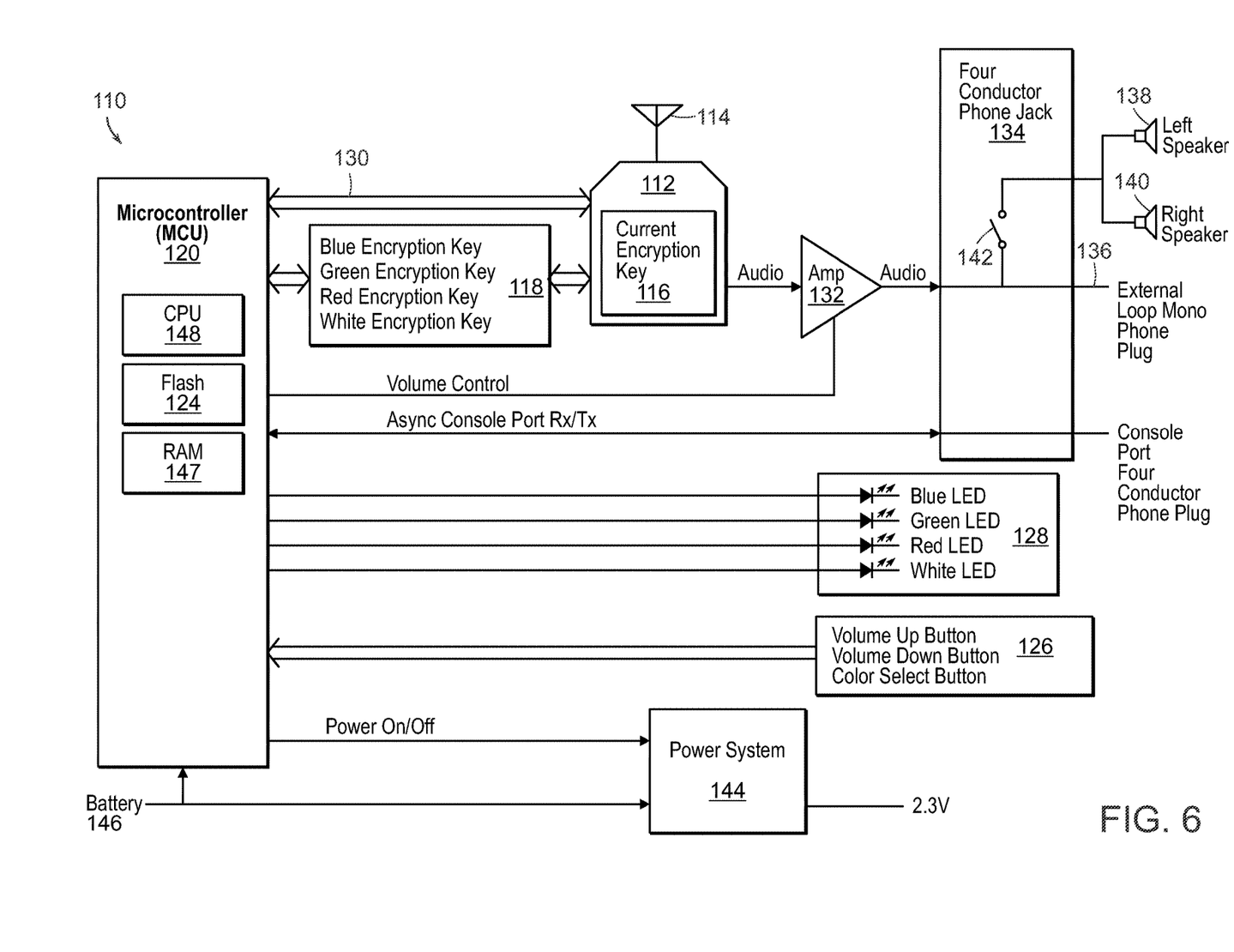
FIG. 6 is a schematic diagram illustrating the wireless headphone used in accordance with the invention.

FIG. 6 is a schematic diagram illustrating a headphone 110 used in accordance with the invention. The headphone 110 includes a communication module 112 that receives signals via antenna 114, including registration data. During the registration sequence, as discussed in FIGS. 3A-3D, encryption keys 116 for up to four transmitters must be stored. Ordinarily the communication module 112 can only store one encryption key 116, so non-volatile memory 118 is utilized to store and provide any additionally stored encryption keys 116 to a microcontroller unit (MCU) 120. The MCU 120 with its inventive firmware stored in flash memory 124, which is executed on a CPU 148 leveraging RAM 147, observes actuation at select button 126 thus controlling color at LED cluster 128 and sending the matching encryption key (corresponding to one of four colors) from non-volatile memory table 118 to current encryption key memory 116. Other radio settings are also exchanged via API at bus 130 between the communication module 112 and MCU 120.

Thereafter, encrypted audio signals from the selected transmitter will be decoded by the communication module 112 and directed to audio amplifier 132. In turn, audio output from amp 132 is switched at four-conductor 3.5 mm audio jack 134 towards output 136 or to left and right earphone speakers 138 and 140. Switch 142 acts to disconnect the speakers 138, 140 as shown, when a mono 3.5 mm plug is inserted at jack 134, thus exclusively directing audio to output 136. This output 136 in turn drives an optional hearing loop (neck loop), as required by the Americans with Disabilities Act for ADA assistive listening systems. The hearing loop communicates by magnetic induction with the T-coil in a hearing aid.

A power system module 144 controls the overall power used by the headphone 110 by managing the power sources used by the MCU 120, such as a battery 146, as well as powering on/off the MCU 120. The power system module 144 outputs a regulated 3.3 V to external sources for power regulation.

The communication module 112 receives and transmits information to a transmitter via the antenna 114. Also, the communication module 112 processes what it receives and transmits using a defined communication protocol for encoding and decoding purposes. The invention is robust to work with any communication protocol, such DECT, Bluetooth, or the like.

Figure 7:
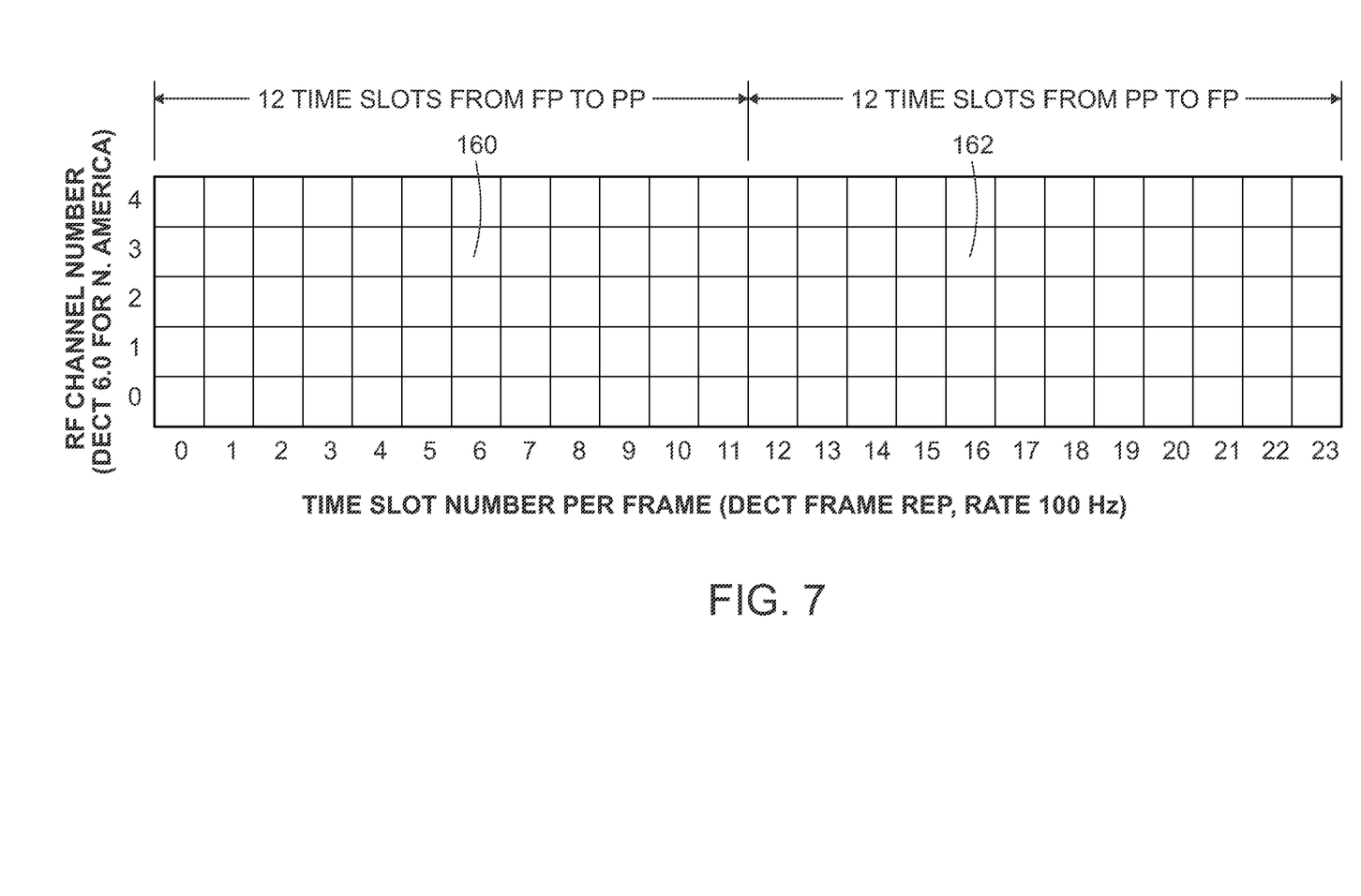
FIG. 7 is a chart depicting RF channels and time slot assignments for DECT 6.0 in accordance with the invention.

FIG. 7 is a time and frequency chart for DECT 6.0, indicating 24 time slots and 5 RF channels. DECT 6.0 operates as a multicarrier Frequency Division Multiple Access (FDMA) and Time Division Multiple Access (TDMA) system. This means that the DECT-allocated radio spectrum is divided into physical carriers in two dimensions: frequency and time. FDMA access provides up to 5 frequency channels, and TDMA access provides 24 time slots per every frame of 10 ms. A third, virtual dimension emulates Code Division Multiple Access (CDMA) by way of encryption keys maintained between Fixed Point and Portable Point. The carrier from FP (the inventive transmitter) to PP (the inventive headphone) might seem like a one-way radio link. However, the DECT 6.0 standard specifies duplex communication, so every endpoint whether FP or PP, transmits and receives 1.9 GHz digital signals within a frame of 24 time slots, at a frame rate of 100 Hz (or 10 msec frame duration) on any available RF channel. Time slots are assigned automatically and uniquely for each DECT link, one from a group of twelve FP slots and similarly one of twelve PP slots. For example in FIG. 7 time slot 6 of channel 3 is shown as FP slot 160 while time slot 16 of channel 3 is shown as PP slot 162. It is evident in FIG. 7 that, arithmetically, up to sixty distinct DECT 6.0 links or carriers may coexist:

(5 RF channels)×(12 time slots)=60 RF carriers

In practice a number smaller than sixty may be preferable, to prevent desensitization (receiver desense) that may be caused by meager receiver selectivity. Even so a number of systems appreciably higher than four can coexist, well beyond the four-transmitter system of the first embodiment of the invention.

Figure 8:
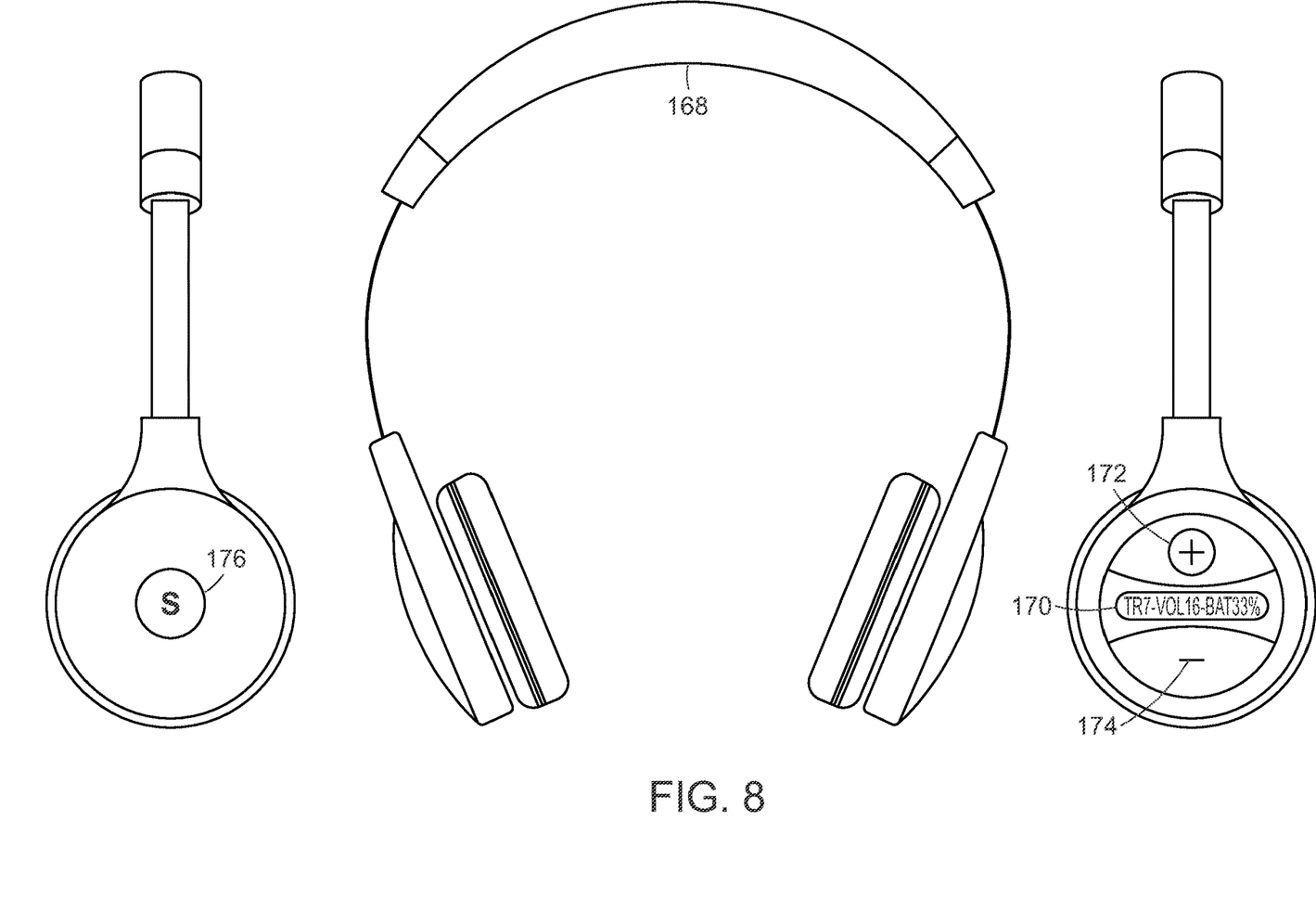
FIG. 8 is a schematic diagram illustrating another embodiment of the wireless headphone having a digital display used in accordance with the invention.

FIG. 8 depicts an alternative embodiment of the invention. Here headphone 168 is constructed with an alphanumeric display 170 to replace LED cluster 128 of FIG. 6, such that one from several additional transmitters can be selected, for example one of twelve. This embodiment facilitates transmitter number selection and visual indication, with the added benefit of displaying volume level and battery charge status. For instance:

TR 7–VOL 16–BATT 60% may be displayed. Volume Up button 172, Volume Down button 174 and Select button 176 operate as previously disclosed with reference to FIGS. 3A-3D for registration and FIGS. 4A-4D for normal operation with audio signals. The transmitter of this alternative embodiment will likewise be constructed with an alphanumeric display for visual indication of assigned transmitter number and battery charge status.

The invention is compatible with many kinds of wireless listening apparatuses and can be used interchangeably with the wireless headphones described herein. The listening apparatus can include an electronic unit separate from and connected to ear buds or headphones, self-contained earphones that incorporate batteries and electronics, or the like.

Although the present invention has been shown and described with respect to several preferred embodiments thereof, various changes, omissions and additions to the form and detail thereof, may be made therein, without departing from the spirit and scope of the invention.

What is claimed is:

1. A wireless audio system comprising:
  at least one listening apparatus, each listening apparatus having:
    a first communication module that receives and sends registration information; and
    a control unit; and
  at least one integrated transmitter, each integrated transmitter including a second communication module that receives and responds to said registration information from said at least one listening apparatus in order to register said at least one listening apparatus with said at least one integrated transmitter, wherein
  said control unit manages the registration of the at least one listening apparatus with said at least one integrated transmitter by assigning the transmitter an identifier so as to allow the at least one integrated transmitter to be simultaneously connected to one or more of said at least one listening apparatus, wherein
  said registration information enables registration of said at least one listening apparatus to more than two of said at least one integrated transmitters and also enables audio signals to be received by said at least one listening apparatus from only one of said integrated transmitters.

2. The wireless audio system of claim 1, wherein the control unit stores said registration information on the listening apparatuses in non-volatile memory.

3. The wireless audio system of claim 1, wherein the registration information on the listening apparatuses comprise encryption keys.

4. The wireless audio system of claim 2, wherein the non-volatile memory comprises an encryption key table.

5. The wireless audio system of claim 1, wherein the identifier comprises color or number or name.

6. The transmitter of claim 1, wherein the control unit stores the identifier in memory.

7. A method of performing the operations of a wireless audio system comprising:
    receiving and sending information from at least one listening apparatus in order to be registered with at least one integrated transmitter;
    managing the registration of the listening apparatuses by assigning the transmitter an identifier so as to allow said at least one integrated transmitter to be simultaneously connected to one or more of said at least one listening apparatus;
    enabling registration of said at least one listening apparatus to more than two of said at least one integrated transmitters; and
    enabling audio signals to be received by said at least one listening apparatus from only one of said at least one integrated transmitters.

8. The method of claim 7, wherein the control unit stores information on the listening apparatuses in non-volatile memory.

9. The method of claim 7, wherein the registration information on the listening apparatuses comprise encryption keys.

10. The method of claim 8, wherein the non-volatile memory comprises an encryption key table.

11. The method of claim 7, wherein the identifier comprises color or number or name.

12. The method of claim 7, wherein the control unit stores the identifier in memory.

* * * * *